United States Patent
Na et al.

(10) Patent No.: US 7,031,746 B2
(45) Date of Patent: Apr. 18, 2006

(54) APPARATUS AND METHOD FOR PROCESSING MULTIMEDIA AUDIO SIGNAL FOR A VOICE CALL IN A MOBILE TERMINAL CAPABLE OF RECEIVING DIGITAL MULTIMEDIA BROADCASTING SERVICE

(75) Inventors: Kyoung-Weon Na, Seoul (KR); Kyung-Ha Lee, Seoul (KR)

(73) Assignee: Samsung Electronics Co., Ltd., (KR)

( * ) Notice: Subject to any disclaimer, the term of this patent is extended or adjusted under 35 U.S.C. 154(b) by 311 days.

(21) Appl. No.: 10/671,453

(22) Filed: Sep. 29, 2003

(65) Prior Publication Data

US 2005/0032507 A1 Feb. 10, 2005

(30) Foreign Application Priority Data

Jul. 21, 2003 (KR) ............... 10-2003-0049756

(51) Int. Cl.
*H04Q 7/20* (2006.01)
*H04M 1/00* (2006.01)
*H04M 3/472* (2006.01)
*H04M 11/00* (2006.01)
*H04N 7/14* (2006.01)

(52) U.S. Cl. ............... 455/550.1; 455/414.1; 455/414.3; 455/414.4; 455/566; 455/454; 379/90.01; 348/14.01; 348/14.02

(58) Field of Classification Search .. 455/414.1–414.2, 455/3.06, 418, 454, 550.1, 553.1, 566, 569.2, 455/168.1, 197.1, 334–335, 338; 379/88.13, 379/88.14, 90.1; 370/264–265, 268, 277; 348/14.02, 14.1, 14.11, 14.13; 725/81, 106
See application file for complete search history.

(56) References Cited

U.S. PATENT DOCUMENTS

| | | | | |
|---|---|---|---|---|
| 5,587,735 A | * | 12/1996 | Ishida et al. | 348/14.04 |
| 2002/0065728 A1 | * | 5/2002 | Ogasawara | 705/23 |
| 2004/0052245 A1 | * | 3/2004 | Kwon | 370/352 |
| 2004/0209649 A1 | * | 10/2004 | Lord | 455/558 |

FOREIGN PATENT DOCUMENTS

EP 1 501 221 A2 * 1/2005

* cited by examiner

Primary Examiner—William Trost
Assistant Examiner—Meless Zewdu
(74) Attorney, Agent, or Firm—Roylance Abrams, Berdo & Goodman, L.L.P.

(57) ABSTRACT

An apparatus and method for enabling a user to view a multimedia broadcasting, especially for processing a multimedia audio signal when a voice call is requested during the multimedia broadcasting. In the mobile terminal, an RF module converts a received RF signal for a voice call to a coded signal. An audio processor converts the coded signal to an electrical voice signal and outputs it through a speaker. A demultiplexer receives a digital multimedia signal and separates it into an audio signal and a video signal. A decoder decodes the audio and video signals and provides the decoded audio signal to the speaker and the decoded video signal to a display. A controller discontinues decoding the audio signal and outputs the voice signal from the audio processor through the speaker, if a voice call request is generated during receiving of the digital multimedia signal.

64 Claims, 6 Drawing Sheets

APPARATUS AND METHOD FOR PROCESSING MULTIMEDIA AUDIO SIGNAL FOR A VOICE CALL IN A MOBILE TERMINAL CAPABLE OF RECEIVING DIGITAL MULTIMEDIA BROADCASTING SERVICE

PRIORITY

This application claims priority under 35 U.S.C. § 119 to an application entitled "Apparatus and Method for Processing Multimedia Audio Signal for Voice Call in a Mobile Terminal Capable of Receiving Digital Multimedia Broadcasting Service" filed in the Korean Intellectual Property Office on Jul. 21, 2003 and assigned Serial No. 2003-49756, the contents of which are incorporated herein by reference.

BACKGROUND OF THE INVENTION

1. Field of the Invention

The present invention relates generally to a mobile terminal for viewing multimedia broadcasting, and in particular, to an apparatus and method for processing audio signals involved in a multimedia broadcasting service when a voice call connection is required during the multimedia broadcasting service in progress.

2. Description of the Related Art

To satisfy the recent ever-increasing demand for radio transmission of multimedia data, mobile terminals capable of receiving digital multimedia broadcasting (DMB) services have been developed. These mobile terminals each have separate receivers for typical call processing and DMB reception. Hence, they enable users to view digital TV broadcasts in real time and receive a typical mobile call service such as a voice call at the same time.

However, existing mobile terminals capable of receiving digital multimedia data streaming broadcasting cannot receive the typical mobile call service while the broadcast is being viewed. A $2^{nd}$ generation mobile communication network confines each mobile terminal to one service. In other words, concurrent provisioning of a plurality of services is not available to a mobile terminal. Consequently, the digital multimedia data stream broadcast is interrupted in order to receive the typical mobile call service. On the other hand, a $3^{rd}$ generation mobile communication network under a multimedia environment will be able to provide concurrent service without interrupting an ongoing service. Thus, a user can conduct a voice call while viewing the digital multimedia data stream broadcast.

Both the DMB and the digital multimedia data streaming broadcasting involve audio signals as well as video signals. In the case of a voice call occurring during the viewing of a broadcast, audio signals for the multimedia broadcast overlap with voice from the voice call.

SUMMARY OF THE INVENTION

It is, therefore, an object of the present invention to provide a method and apparatus for muting only DMB audio signals if a voice call is required during a DMB.

It is another object of the present invention to provide a method and apparatus for continuing the processing of DMB video signals, while discontinuing the processing of DMB audio signals, if a voice call is required during a DMB.

It is a further object of the present invention to provide a method and apparatus for interrupting broadcast viewing or discontinuing only DMB audio signals according to user selection, if a voice call is required during a DMB.

It is still another object of the present invention to provide a method and apparatus for discontinuing processing DMB audio signals if a user wants to view a DMB during a voice call.

It is yet another object of the present invention to provide a method and apparatus for outputting DMB audio signals in text data, and discontinuing the processing of the DMB audio signals, if a voice call is required during a DMB.

The above and other objects are substantially accomplished by a mobile terminal capable of enabling a user to view a multimedia broadcast, especially of processing a multimedia audio signal when a voice call is requested during the multimedia broadcast.

According to one embodiment of the present invention, in a mobile terminal capable of receiving a digital multimedia signal having compressed-coded audio and video signals multiplexed, an RF module receives an RF signal for a voice call and converts the RF signal to a coded signal. An audio processor converts the coded signal to an electrical voice signal and outputs the electrical voice signal through a speaker. A DEMUX receives a digital multimedia signal and separates the digital multimedia signal into an audio signal and a video signal. A decoder decodes the audio and video signals and provides the decoded audio signal to the speaker and the decoded video signal to a display. A controller controls decoding the audio signal in the decoder to be discontinued and controls the voice signal to be output from the audio processor through the speaker, if a voice call request is generated during receiving the digital multimedia signal.

According to another embodiment of the present invention, in a mobile terminal capable of receiving a digital multimedia signal having compressed-coded audio and video signals multiplexed, an RF module receives an RF signal for a voice call and converts the RF signal to a coded signal. An audio processor converts the coded signal to an electrical voice signal and outputs the electrical voice signal through a speaker. A DEMUX receives a digital multimedia signal and separates the digital multimedia signal into an audio signal and a video signal. A decoder decodes the audio and video signals and provides the decoded audio signal to the speaker and the decoded video signal to a display. A controller controls decoding the audio signal in the decoder to be discontinued and controls the voice signal to be output from the audio processor through the speaker, if a digital multimedia request is generated during the voice call.

According to a further embodiment of the present invention, in a mobile terminal capable of receiving a digital multimedia signal having compressed-coded audio and video signals multiplexed, an RF module receives an RF signal for a voice call and converts the RF signal to a coded signal. An audio processor converts the coded signal to an electrical voice signal and outputs the electrical voice signal through a speaker. A DEMUX receives a digital multimedia signal and separates the digital multimedia signal into an audio signal and a video signal. A decoder decodes the audio and video signals and provides the decoded audio signal to the speaker and the decoded video signal to a display. A controller controls decoding the audio signal in the decoder to be discontinued and controls the voice signal to be output from the audio processor through the speaker, if a voice call request and a digital multimedia request are generated simultaneously.

According to still another embodiment of the present invention, in a method of processing an audio signal in a mobile terminal capable of receiving a digital multimedia signal having the compressed-coded audio and video signals multiplexed, a digital multimedia signal is received and separated into an audio signal and video signal. The audio and video signals are decoded and output to a speaker and a display, respectively. If a voice call request is generated during receiving the digital multimedia signal, decoding the audio signal is discontinued. An RF signal for a voice call is received, converted to an electrical voice signal, and output through the speaker.

According to yet another embodiment of the present invention, in a method of processing an audio signal in a mobile terminal capable of receiving a digital multimedia signal having the compressed-coded audio and video signals multiplexed, an RF signal for a voice call is received, converted to an electrical voice signal, and output through a speaker. If a digital multimedia request is generated during the voice call, a digital multimedia signal is received and separated into an audio signal and a video signal. The audio and video signals are decoded and output to the speaker and to a display, respectively. Decoding the audio signal is discontinued, while the video signal is decoded and displayed on the display.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Several embodiments of the present invention will be described herein below with reference to the accompanying drawings. In the following description, well-known functions or constructions are omitted for conciseness.

Figure 1:
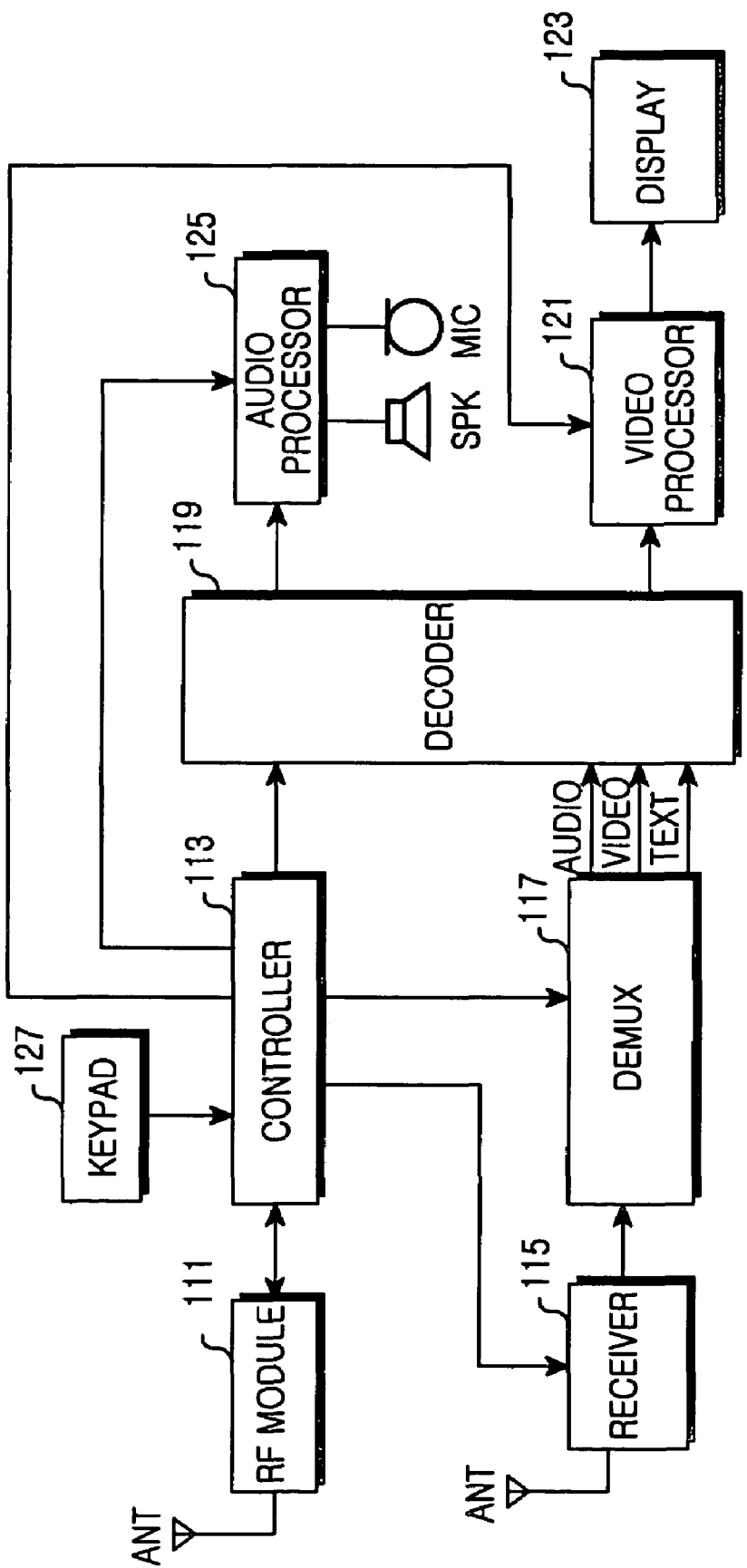
FIG. 1 is a block diagram illustrating an example of a mobile terminal according to an embodiment of the present invention.

FIG. 1 is a block diagram illustrating an example of a mobile terminal according to an embodiment of the present invention. With reference to FIG. 1, the structure and operation of the mobile terminal will be described in detail.

An Radio Frequency (RF) module 111 converts an RF signal received through an antenna (ANT) to a signal in a predetermined frequency band under the control of a controller 113 and provides the converted signal to the controller 113 or an audio processor 125. The RF module 111 also converts a coded signal received from the audio processor 125 to an RF signal and provides the RF signal to the antenna. Signals that the RF module 111 transmits to the controller 113 are a pilot signal, a paging signal, data, and a power control-related signal transmitted from a base station. The controller 113 transmits control signals associated with call setup or power control, and packet data to the RF module 111, for transmission to the base station. Therefore, a signal transmitted from the RF module 111 to the audio processor 125 is a coded voice signal received after a call setup.

The controller 113 provides overall control to the mobile terminal. In accordance with the embodiment of the present invention, the controller 113 determines whether a voice call has been requested when a digital multimedia signal is being received and controls a decoder 119 or a demultiplexer (DEMUX) 117 to process an audio signal multiplexed in the digital multimedia signal according to the determination.

A receiver 115 receives a DMB signal where at least one of a video signal, an audio signal, and an additional signal is multiplexed therein. The video signal, audio signal, and additional signal are compressed and coded to independent packets and then multiplexed prior to transmission. The compression and coding can be performed by a general compression method such as the International Telecommunication Union-Telecommunication Standardization Sector (ITU-T) recommendation H.264 also known as the Moving Picture Expert Group 4 part 10 (MPEG4 p.10) or MPEG4 Advance Audio Coding (AAC). The additional signal includes a text signal such as on-screen data related to the video and audio signals.

The digital multimedia signal can be a DMB signal transmitted from a satellite or a gap filler. Or the digital multimedia signal can be a digital multimedia data streaming broadcasting signal, a video on demand (VOD) signal, or a music on demand/audio on demand (MOD/AOD) signal. For notational simplicity, the digital multimedia signal is assumed to be a DMB signal. Yet, the digital multimedia signal is not confined to the DMB signal.

The receiver 115 low-noise amplifies the digital multimedia signal and downconverts its frequency to an intermediate frequency (IF). The IF signal is despread with a spreading code corresponding to a reception channel designated through a keypad 127 by a user, and the despread channel signal is demodulated in a demodulator (not shown). The receiver 115 receives the digital multimedia signal via the antenna (ANT).

The DEMUX 117 demultiplexes the demodulated channel signal received from the receiver 115 to provide the audio signal, video signal, and text signal.

A decoder 119 comprises of an audio decoder (not shown), a video decoder (not shown), and an additional signal decoder (not shown). The audio decoder decodes the audio signal and provides it to the audio processor 125. The video decoder decodes the video signal and provides it to a display 123 via a video processor 121. The additional signal decoder decodes the additional signal including a text signal and provides the text signal to the display 123 via the video processor 121. The controller 113 can control the text signal not to be displayed on the display 123 according to user selection. The decoder 119 also decodes a multimedia signal such as moving pictures or music stored in a memory (not shown).

The audio processor 125 includes an audio CODEC (not shown) for converting a coded voice signal received from the RF module 111 to an electrical voice signal and outputting it through a speaker (SPK), or encoding an electrical voice signal received through a microphone (MIC) and providing the coded voice signal to the RF module 111. The audio processor 125 may further include a stereo CODEC (not shown) for converting a decoded audio signal received from the audio decoder to a stereo audio signal. While it is described herein that the audio processor 125 has both the audio CODEC and the stereo CODEC, it should be noted that the audio CODEC and the stereo CODEC can be built separately or the audio CODEC can be incorporated in the controller without departing from the scope of the present invention. If the mobile terminal is configured not to provide a stereo signal, the stereo CODEC is not implemented.

The video processor 121 converts the decoded video signal received from the video decoder of the decoder 119 to video data and provides it to the display 123. The display 123 displays the video signal received from the video processor 121 and user data received from the controller 113. The keypad 127 takes the form of a key matrix. It includes digit keys for dialing and function keys. The keypad 127 generates a key signal corresponding to a key pressed by the user and provides the key signal to the controller 113. The keypad 127 has a separately designated function key or a multi-function key for receiving digital multimedia data and requesting a voice call. It should be appreciated that the keypad 127 can be implemented as a touch pad or a virtual key board.

Figure 2:
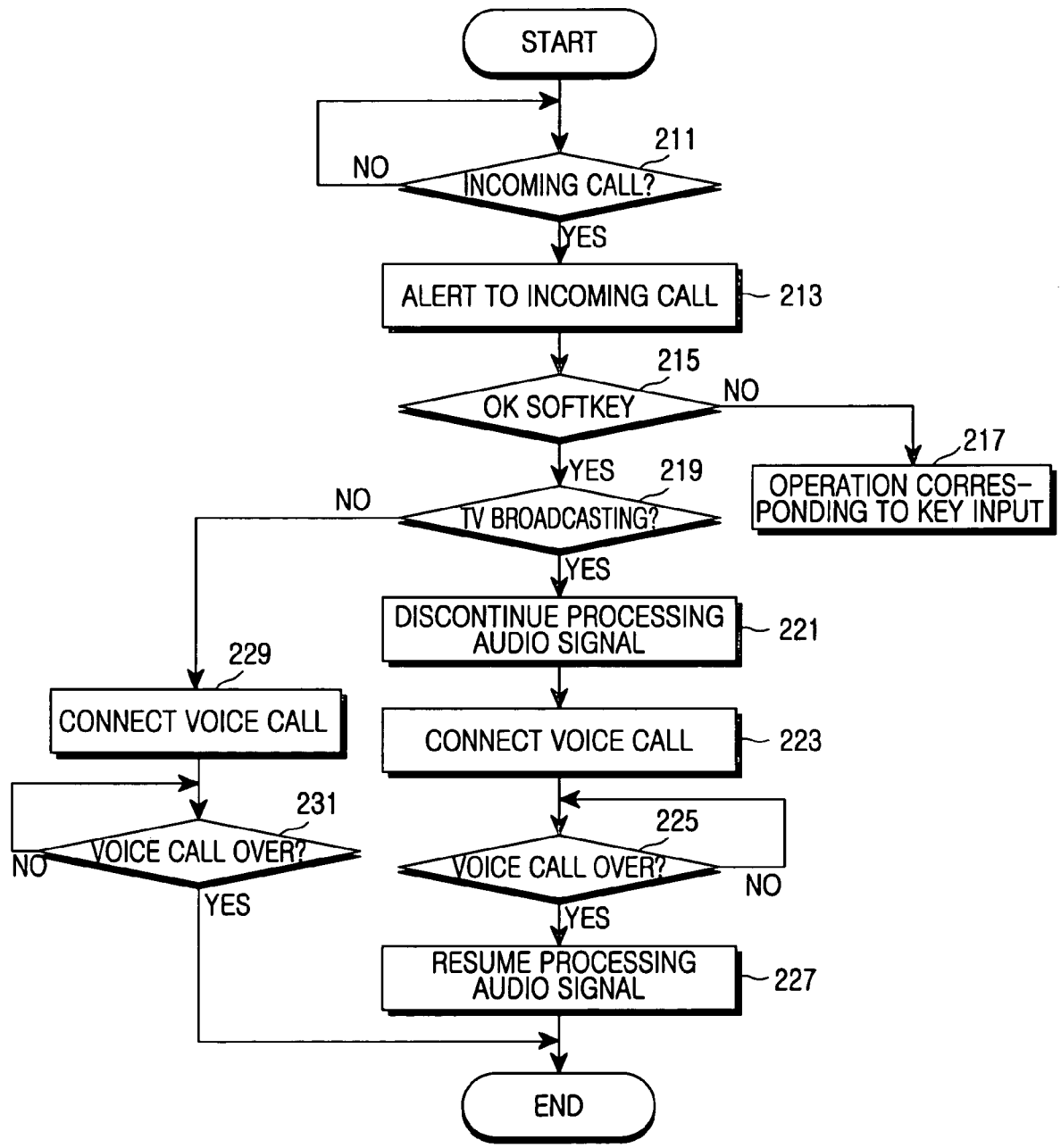
FIG. 2 is a flowchart illustrating an example of a method of processing DMB audio signals according to whether a DMB is being received during an incoming voice call according to an embodiment of the present invention.

FIG. 2 is a flowchart illustrating an example of a method of processing multimedia audio signals according to whether a DMB received when an incoming call is detected according to an embodiment of the present invention. With reference to FIGS. 1 and 2, a detailed description will be made of how reception of the multimedia audio signals is discontinued upon request for a voice call during the DMB in progress.

Referring to FIG. 2, the controller 113 determines whether an incoming voice call has been detected in step 211. Upon detection of the incoming voice call, the controller 113 proceeds to step 213. Otherwise, it repeats step 211. In step 213, the controller 113 alerts a user to the incoming voice call by bell ringing, vibrating, or lamp flashing according to a user setting.

In step 215, the controller 113 determines whether the incoming voice call is requested to be connected. This determination can be made through a press of an OK softkey. Upon input of the OK softkey, the controller 113 proceeds to step 219, when the user has requested the voice call. Upon input of a key other than the OK softkey, the controller 113 performs an operation corresponding to the input key in step 217. If a call is connected by opening a folder in a folder-type phone, the folder opening is equivalent to the input of the OK softkey. Obviously to those skilled in the art, the step 215 can be omitted and the controller 113 can proceed from step 213 to step 219 upon detecting the incoming voice call.

The controller 113 determines whether a DMB is in progress in step 219. The decision can be made from a predetermined flag or in any other manner, as understood to those skilled in the art. If the DMB is in progress, the controller 113 proceeds to step 221. Otherwise, it goes to step 229.

In step 221, the controller 113 controls the decoder 119 not to decode an audio signal output from the DEMUX 117, while the decoder 119 continues decoding a video signal and a text signal and displaying them on the display 123 through the video processor 121.

While the controller 113 automatically discontinues processing the DMB audio signal in the case of the ongoing DMB in the present invention, it is obvious to those skilled in the art that instead, the user can select whether to discontinue processing the DMB audio signal. Specifically, the controller 113 asks the user whether to discontinue processing the DMB audio signal through the display 123 and the user responds using a predetermined key in the keypad 127. Alternatively, the user can give priority levels to the DMB audio signal or the voice call and the controller 113 determines whether to discontinue processing the DMB audio signal according to the priority levels.

While the controller 113 controls the decoder 119 in relation to discontinuation of the processing of the DMB audio signal in the embodiment of the present invention, it can control the DEMUX 117 not to output the demultiplexed DMB signal to the decoder 119, instead.

In step 223, the controller 113 connects the voice call by controlling the audio processor 125 to convert a coded voice signal received from the RF module 111 to an electrical voice signal and output the electrical voice signal through the speaker. The controller 113 determines whether the voice call is over in step 225. If the voice call is over, the controller 113 proceeds to step 227. On the contrary, if the voice call continues, the controller 113 repeats step 225. In step 227, the controller 113 controls the decoder 119 to resume decoding of the DMB audio signal and then terminates the procedure.

Meanwhile, the controller 113 connects the voice call by controlling the audio processor 125 to convert a coded voice signal received from the RF module 111 to an electrical voice signal and output the electrical voice signal through the speaker in step 229. The controller 113 determines whether the voice call is over in step 231. If the voice call is over, the controller 113 terminates the procedure. On the contrary, if the voice call continues, the controller 113 repeats step 231.

Figure 3:
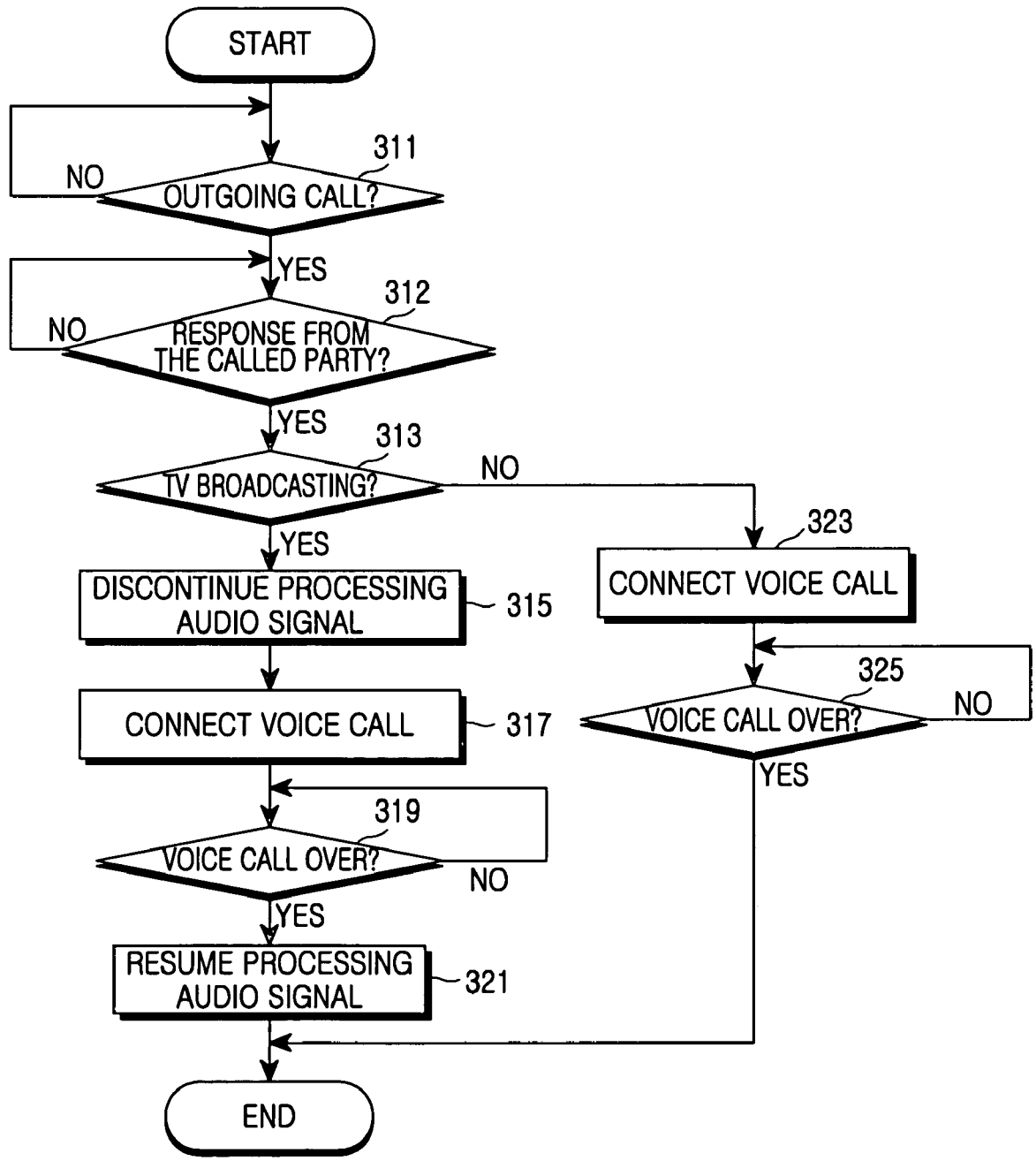
FIG. 3 is a flowchart illustrating an example of a method of processing DMB audio signals according to whether a DMB is being received during an outgoing voice call according to another embodiment of the present invention.

FIG. 3 is a flowchart illustrating an example of a method of processing a DMB audio signal according to whether a DMB is in progress when an outgoing call is requested according to another embodiment of the present invention.

Referring to FIG. 3, the controller 113 determines whether an outgoing voice call has been requested in step 311. The outgoing call is requested when the user sets a called party via the keypad 127 and presses the OK softkey. Upon request for an outgoing call, the controller 113 originates a call to the called party and detects a response from the called party in step 312. In the absence of a response from the called party, the controller 113 repeats step 312. Upon detection of a response from the called party, the controller 113 proceeds to step 313. It is to be noted that the controller 113 can directly proceed to step 313 from step 311.

In step 313, the controller 113 determines whether a DMB is being received or not. In the case of an ongoing DMB, the controller proceeds to step 315. Otherwise, it goes to step 323.

The controller 113 controls the decoder 119 not to decode a DMB audio signal output from the DEMUX 117 in step 315, while the decoder 119 continues decoding a video signal and a text signal and displaying them on the display 123 via the video processor 121.

In step 317, the controller 113 connects the voice call by controlling the audio processor 125 to convert a coded voice signal received from the RF module 111 to an electrical voice signal and output the electrical voice signal through the speaker. The controller 113 determines whether the voice call is over in step 319. If the voice call is over, the controller 113 proceeds to step 321. On the contrary, if the voice call continues, the controller 113 repeats step 319. In step 321, the controller 113 controls the decoder 119 to resume decoding of the DMB audio signal and then terminates the procedure.

Meanwhile, the controller 113 connects the voice call by controlling the audio processor 125 to convert a coded voice signal received from the RF module 111 to an electrical voice signal and output the electrical voice signal through the speaker in step 323. The controller 113 determines whether the voice call is over in step 325. If the voice call is over, the controller 113 terminates the procedure. On the contrary, if the voice call continues, the controller 113 repeats step 325.

Figure 4:
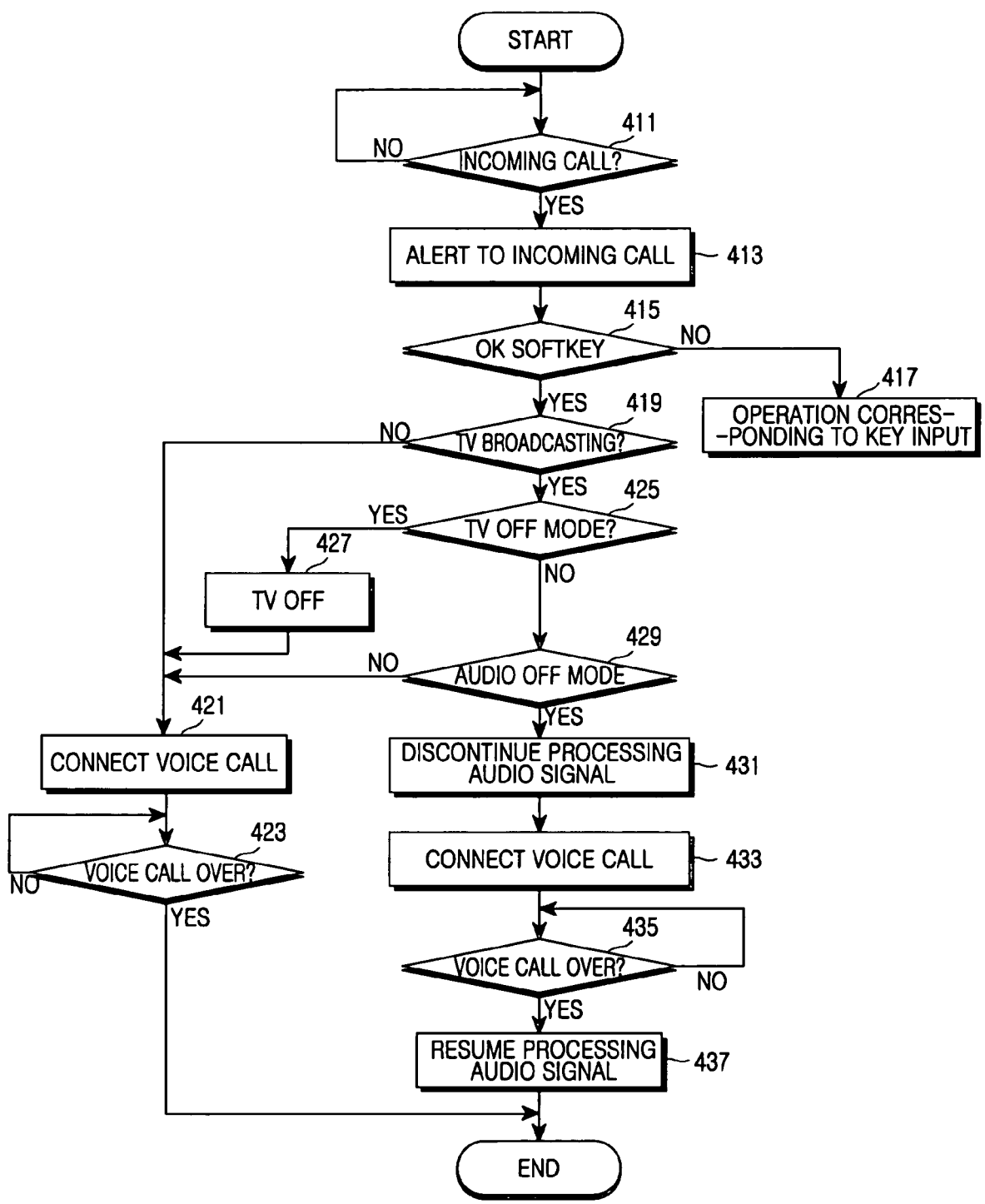
FIG. 4 is a flowchart illustrating an example of a method of processing a broadcasting signal according to user setting when a voice call is required during a DMB according to a third embodiment of the present invention.

FIG. 4 is a flowchart illustrating an example of a method of processing a broadcasting signal according to user setting when a voice call is requested when receiving a DMB according to a third embodiment of the present invention. While an incoming voice call is assumed herein, the present invention is applicable to an outgoing voice call operating substantially in the same manner.

Referring to FIG. 4, the controller 113 determines whether an incoming voice call has been detected in step 411. Upon detection of an incoming voice call, the controller 113 proceeds to step 413. Otherwise, it repeats step 411. In step 413, the controller 113 alerts a user to the incoming of the voice call by bell ringing, vibrating, or lamp flashing according to a user setting.

In step 415, the controller 113 determines whether the user has pressed an OK softkey. Upon input of the OK softkey, the controller 113 proceeds to step 419, when the user has requested the voice call. Upon input of a key other than the OK softkey, the controller 113 performs an operation corresponding to the input key in step 417. It should be noted that the voice call request can be determined from the pressing of a key designated for call connection or in any other manner, instead of pressing the OK softkey.

The controller 113 determines whether a DMB is in progress in step 419. If the DMB is in progress, the controller 113 proceeds to step 425. Otherwise, it goes to step 421. In step 421, the controller 113 connects the voice call. The controller 113 then determines whether the voice call is over in step 423. If the voice call continues, the controller 113 repeats step 423. If the voice call is over, the controller 113 terminates the procedure.

Meanwhile, the controller 113 determines a user-set DMB signal processing mode during a DMB in step 425. In the embodiment of the present invention, the DMB signal processing mode is set to "TV off" or "audio off". In the TV off mode, only a voice call is conducted with the DMB interrupted. In the audio off mode, only a DMB audio signal is discontinued, while a video signal and a text signal are displayed on the display 123. The DMB signal processing mode is set preliminarily by the user (i.e., before the call is received) or directly by the user when a voice call is requested during the DMB.

When the TV off mode is selected, the controller 113 discontinues reception of the DMB signal in step 427 and proceeds to step 421. It can be further contemplated that the DMB signal is received but the controller 113 controls the DEMUX 117 or the decoder 119 not to process the received DMB signal.

If the DMB signal processing mode is not TV off in step 425, the controller 113 determines whether it is audio off in step 429. If the audio off mode is set, the controller 113 proceeds to step 431. Otherwise, it goes to step 421. If the audio off mode is not set, both a DMB audio signal and a voice signal are output through the speaker. Alternatively, the DMB audio signal is output through the speaker and/or the voice signal is output through an earphone.

In step 431, the controller 113 controls the decoder 119 not to decode the DMB audio signal output from the DEMUX 117, while the decoder 119 continues decoding and displaying a video signal and a text signal on the display 123 via the video processor 121.

In step 433, the controller 113 connects the voice call by controlling the audio processor 125 to convert a coded voice signal received from the RF module 111 to an electrical voice signal and output the electrical voice signal through the speaker. The controller 113 determines whether the voice call is over in step 435. If the voice call is over, the controller 113 proceeds to step 437. On the contrary, if the voice call continues, the controller 113 repeats step 435. In step 437, the controller 113 controls the decoder 119 to resume decoding of the DMB audio signal and then terminates the procedure.

Figure 5:
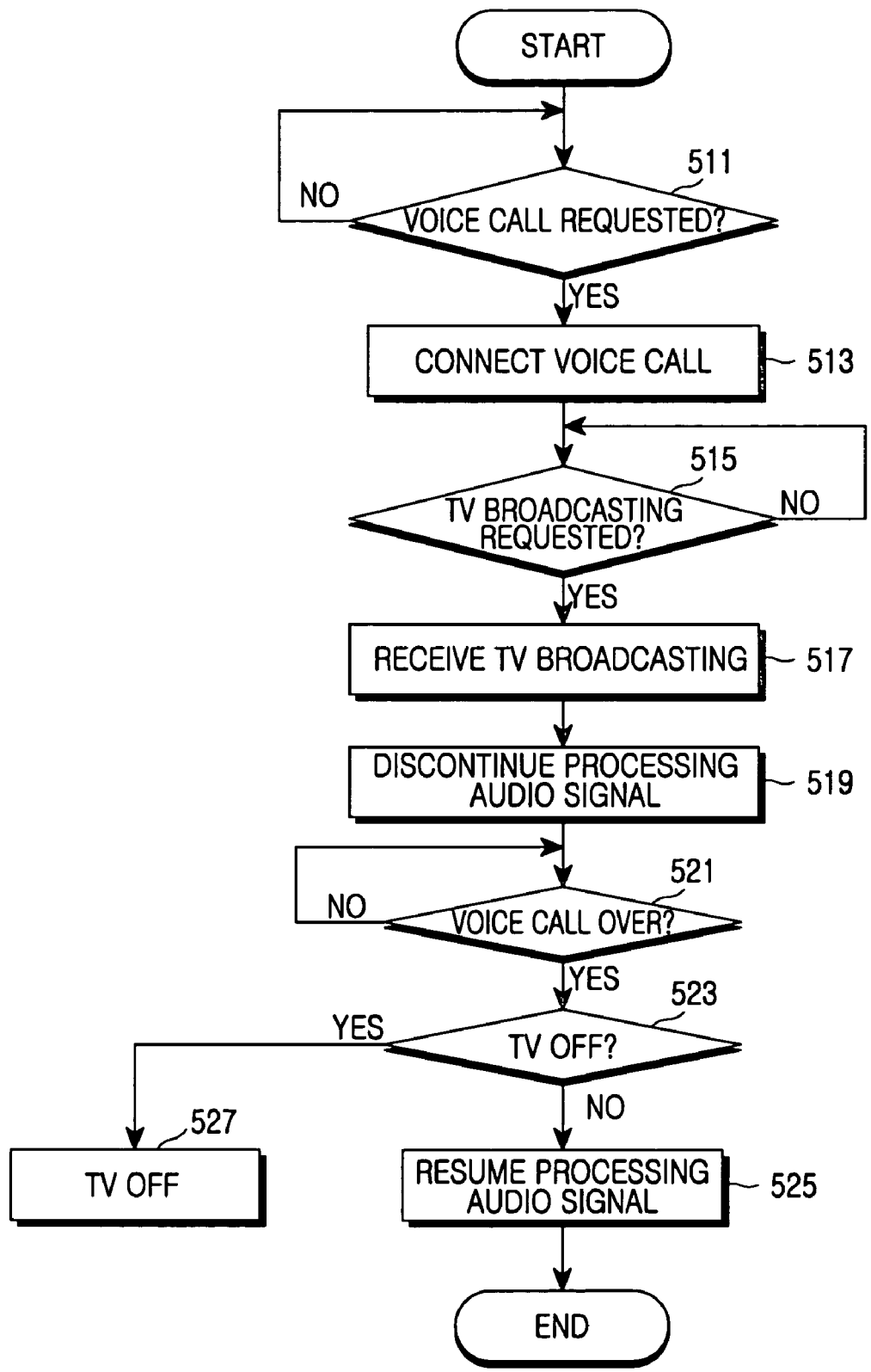
FIG. 5 is a flowchart illustrating an example of a method of processing DMB audio signals according to whether a voice call is being conducted or not when a DMB is requested according to a fourth embodiment of the present invention.

How to process a DMB audio signal according to whether a DMB is currently in progress when a voice call is requested has been described so far with reference to FIGS. 1 to 4. FIG. 5 is a flowchart illustrating an example of a method of processing a DMB audio signal according to whether a voice call is being conducted according to a fourth embodiment of the present invention.

Referring to FIG. 5, the controller 113 determines whether a voice call has been requested in step 511. If either an incoming voice call or an outgoing voice call is detected, the controller 113 considers that a voice call request has been generated. In the absence of a voice call request, the controller 113 repeats step 511. Upon detection of a voice call request, the controller 113 connects the voice call in step 513 and determines whether a DMB is requested in step 515. In general, the DMB request is generated by pressing a predetermined key indicating broadcasting reception. In the absence of the DMB request, the controller 113 repeats step 515. Upon request for a DMB, the controller 113 starts to receive a DMB signal through the receiver 115 in step 517. The DEMUX 117 separates the DMB signal into an audio signal, a video signal, and a text signal. If it is not receiving the DMB signal, the mobile terminal usually blocks power from modules that process the DMB signal. Under the control of the controller 113, power is supplied to the DMB signal processing modules in step 517.

In step 519, the controller 113 controls the decoder 119 to decode and display the video and text signals received from the DEMUX 117 on the display 123 via the video processor 121. However, the decoder 119 does not decode the audio signal received from the DEMUX 117 under the control of the controller 113. Meanwhile, the controller 113 controls the audio processor 125 to convert a coded voice signal received from the RF module 111 to an electrical voice signal and output the electrical voice signal through the speaker.

In step 521, the controller 113 determines whether the voice call is over. If it is over, the controller 113 proceeds to step 523. If it continues, the controller 113 repeats step 521. In step 523, the controller 113 determines the DMB signal processing mode. In the case of TV off, the controller 113 discontinues receiving the DMB signal in step 527. Alternatively, the controller 113 can control the DEMUX 117 or the decoder 119 to discontinue processing the DMB signal, while receiving the DMB signal.

If the DMB signal processing mode is not the TV off mode, the controller 113 controls the decoder 119 to resume decoding the DMB audio signal in step 515 and then terminates the procedure.

Figure 6:
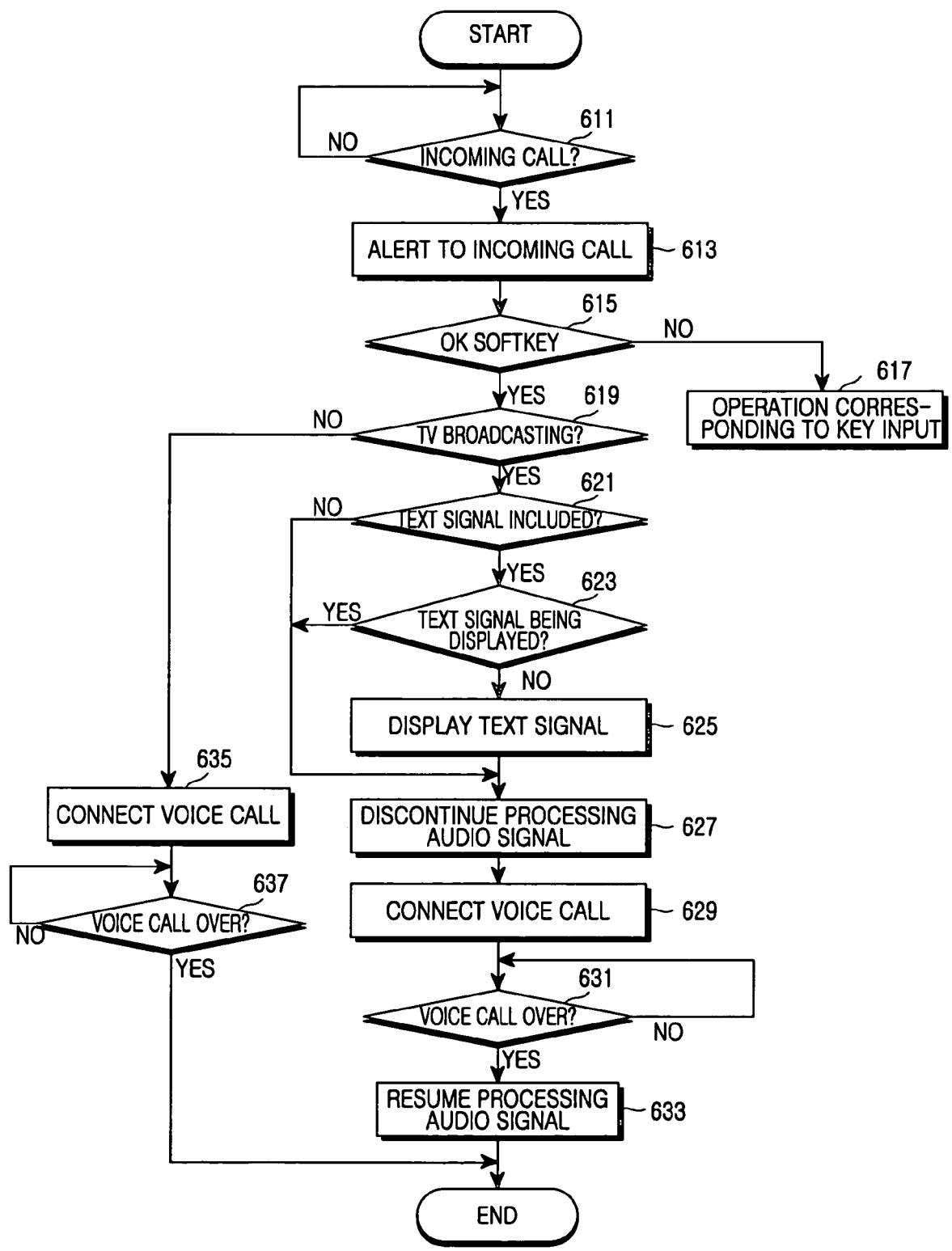
FIG. 6 is a flowchart illustrating an example of a method of processing DMB audio and text signals according to whether a voice call is being conducted when a DMB is requested according to a fifth embodiment of the present invention.

FIG. 6 is a flowchart illustrating an example of a method of processing an audio signal and a text signal according to whether a voice call is being conducted when a DBM is requested according to a fifth embodiment of the present invention. While an incoming voice call is assumed herein, the present invention is applicable to an outgoing voice call in the same manner.

Referring to FIG. 6, the controller 113 determines whether an incoming voice call has been detected in step 611. Upon detection of an incoming voice call, the controller 113 proceeds to step 613. Otherwise, it repeats step 611. In step 613, the controller 113 alerts a user to the incoming of the voice call by bell ringing, vibrating, or lamp flashing according to a user setting.

In step 615, the controller 113 determines whether the user has pressed an OK softkey. Upon input of the OK softkey, the controller 113 proceeds to step 619, when the user has requested the voice call. Upon input of a key other than the OK softkey, the controller 113 performs an operation corresponding to the input key in step 617. It should be appreciated that the voice call request can be determined from the pressing of a key designated for call connection or in any other manner, instead of pressing the OK softkey.

The controller 113 determines whether a DMB is in progress in step 619. If the DMB is in progress, the controller 113 proceeds to step 621. Otherwise, it goes to step 635. In step 635, the controller 113 connects the voice call. The controller 113 then determines whether the voice call is over in step 637. If the voice call continues, the controller 113 repeats step 637. If the voice call is over, the controller 113 terminates the procedure.

On the other hand, in the case of an ongoing DMB, the controller 113 determines whether a received DMB signal includes a text signal in step 621. As described before, the text signal contains on-screen data such as lyrics and words related to the video and audio signals. The text signal can be displayed on the display 123 according to a user selection. If the user determines not to display the text signal, the controller 113 controls the decoder 119 not to decode the text signal, or controls the video processor 121 not to provide the decoded text signal received from the decoder 119 to the display 123. In the absence of a text signal, the controller 113 proceeds to step 627. Upon detection of a text signal, the controller 113 determines whether the current received text signal is being displayed on the display 123 in step 623. If the text signal is being displayed on the display 123, the controller 113 proceeds to step 627. If it is not, the controller 113 proceeds to step 625. The controller 113 controls the decoder 119 or the video processor 121 to display the text signal on the display 123 in step 625, controls the decoder 119 to discontinue decoding the audio signal in step 627, and then connects a voice call by controlling the audio processor to convert a coded voice signal received from the RF module 111 to an electrical voice signal and output it through the speaker in step 629. In step 631, the controller 113 determines whether the voice call is over. If the voice call is over, the controller 113 proceeds to step 633. Otherwise, it repeats step 631. In step 633, the controller 113 controls the decoder 119 to resume decoding the audio signal and terminates the procedure.

In accordance with the present invention as described above, a user can conduct a voice call without being disturbed by a broadcast signal when the user wants to view a DMB and conduct the voice call simultaneously. Also, when the user has to call or receive a call during viewing the DMB, the user can conduct the voice call while viewing the DMB. A third advantage is that the user can view DMB pictures and on-screen data while conducting a voice call.

While the invention has been shown and described with reference to certain embodiments thereof, it will be understood by those skilled in the art that various changes in form and details may be made therein without departing from the spirit and scope of the invention as defined by the appended claims.

What is claimed is:

1. A mobile terminal capable of receiving a digital multimedia signal having compressed-coded audio and video signals multiplexed, comprising:
   an Radio Frequency (RF) module for receiving an RF signal for a voice call and converting the RF signal to a coded signal;
   an audio processor for converting the coded signal to an electrical voice signal and outputting the electrical voice signal through a speaker;
   a demultiplexer for receiving a digital multimedia signal and separating the digital multimedia signal into an audio signal and a video signal;
   a decoder for decoding the audio and video signals and providing the decoded audio signal to the speaker and the decoded video signal to a display; and
   a controller for controlling decoding the audio signal in the decoder to be discontinued and controlling the voice signal to be output from the audio processor through the speaker, if a voice call request is generated during receiving of the digital multimedia signal.

2. The mobile terminal of claim 1, wherein the controller controls the decoder to discontinue decoding the audio signal output from the demultiplexer if the voice call request is generated during receiving of the digital multimedia signal.

3. The mobile terminal of claim 1, wherein the controller controls the demultiplexer not to output the audio signal to the decoder if the voice call request is generated during receiving of the digital multimedia signal.

4. The mobile terminal of claim 1, wherein the controller determines that the voice call request is generated upon input of a predetermined key indicating call connection when an incoming voice call is detected.

5. The mobile terminal of claim 1, wherein the controller determines that the voice call request is generated when an outgoing voice call is requested.

6. The mobile terminal of claim 1, wherein the controller determines that the voice call request is generated when the controller originates a call to a designated called party and receives a response signal from the called party.

7. The mobile terminal of claim 1, wherein the digital multimedia signal further includes a compressed-coded text signal and the demultiplexer separates the text signal from the digital multimedia signal.

8. The mobile terminal of claim 7, wherein the controller controls the decoder to decode the text signal and output the text signal to the display when the voice call request is generated and the text signal is not being displayed on the display.

9. The mobile terminal of claim 1, wherein the controller decides whether to discontinue decoding of the audio signal according to user selection when the voice call request is generated during receiving the digital multimedia signal.

10. The mobile terminal of claim 9, wherein the controller decides whether to block reception of the digital multimedia signal according to the user selection.

11. The mobile terminal of claim 10, wherein the user selection is made by input of a predetermined key.

12. The mobile terminal of claim 10, wherein the user selection is made according to priority levels given to the voice call and the digital multimedia signal by the user.

13. The mobile terminal of claim 9, wherein the user selection is made by input of a predetermined key.

14. The mobile terminal of claim 9, wherein the user selection is made according to priority levels given to the voice call and the digital multimedia signal by the user.

15. The mobile terminal of claim 1, wherein the controller checks whether the voice call is over and controls the decoder to resume decoding the audio signal if the voice call is over.

16. A mobile terminal capable of receiving a digital multimedia signal having compressed-coded audio and video signals multiplexed, comprising:
an Radio Frequency (RF) module for receiving an RF signal for a voice call and converting the RF signal to a coded signal;
an audio processor for converting the coded signal to an electrical voice signal and outputting the electrical voice signal through a speaker;
a demultiplexer for receiving a digital multimedia signal and separating the digital multimedia signal into an audio signal and a video signal;
a decoder for decoding the audio and video signals and providing the decoded audio signal to the speaker and the decoded video signal to a display; and
a controller for controlling decoding the audio signal in the decoder to be discontinued and controlling the voice signal to be output from the audio processor through the speaker, if a digital multimedia request is generated during the voice call.

17. The mobile terminal of claim 16, wherein the controller controls the decoder to discontinue decoding the audio signal output from the demultiplexer if the digital multimedia signal reception request is generated during the voice call.

18. The mobile terminal of claim 16, wherein the controller controls the demultiplexer not to output the audio signal to the decoder if the digital multimedia request is generated during the voice call.

19. The mobile terminal of claim 16, wherein the digital multimedia signal further includes a compressed-coded text signal and the demultiplexer separates the text signal from the digital multimedia signal.

20. The mobile terminal of claim 19, wherein the controller controls the decoder to decode the text signal and output the text signal to the display when the digital multimedia request is generated and the text signal is not being displayed on the display.

21. The mobile terminal of claim 16, wherein the controller decides whether to discontinue decoding of the audio signal according to user selection when the digital multimedia request is generated during the voice call.

22. The mobile terminal of claim 21, wherein the controller decides whether to block reception of the digital multimedia signal according to the user selection.

23. The mobile terminal of claim 22, wherein the user selection is made by input of a predetermined key.

24. The mobile terminal of claim 22, wherein the user selection is made according to priority levels given to the voice call and the digital multimedia signal by the user.

25. The mobile terminal of claim 21, wherein the user selection is made by input of a predetermined key.

26. The mobile terminal of claim 21, wherein the user selection is made according to priority levels given to the voice call and the digital multimedia signal by the user.

27. The mobile terminal of claim 16, wherein the controller checks whether the voice call is over and controls the decoder to resume decoding the audio signal if the voice call is over.

28. A mobile terminal capable of receiving a digital multimedia signal having compressed-coded audio and video signals multiplexed, comprising:
an Radio Frequency (RF) module for receiving an RF signal for a voice call and converting the RF signal to a coded signal;
an audio processor for converting the coded signal to an electrical voice signal and outputting the electrical voice signal through a speaker;
a demultiplexer for receiving a digital multimedia signal and separating the digital multimedia signal into an audio signal and a video signal;
a decoder for decoding the audio and video signals and providing the decoded audio signal to the speaker and the decoded video signal to a display; and
a controller for controlling decoding the audio signal in the decoder to be discontinued and controlling the voice signal to be output from the audio processor through the speaker, if a voice call service and a digital multimedia service are requested simultaneously.

29. The mobile terminal of claim 28, wherein the controller controls the decoder to discontinue decoding the audio signal output from the demultiplexer if the voice call request and the digital multimedia request are generated simultaneously.

30. The mobile terminal of claim 28, wherein the controller controls the demultiplexer not to output the audio signal to the decoder if the voice call request and the digital multimedia request are generated simultaneously.

31. The mobile terminal of claim 28, wherein the controller determines that the voice call request is generated upon input of a predetermined key indicating call connection when an incoming voice call is detected.

32. The mobile terminal of claim 28, wherein the controller determines that the voice call request is generated when an outgoing voice call is requested.

33. The mobile terminal of claim 28, wherein the controller determines that the voice call request is generated when the controller originates a call to a designated called party and receives a response signal from the called party.

34. The mobile terminal of claim 28, wherein the controller decides whether to discontinue decoding the audio signal according to user selection when the voice call request and the digital multimedia request are generated simultaneously.

35. The mobile terminal of claim 34, wherein the controller decides whether to block reception of the digital multimedia signal according to the user selection.

36. The mobile terminal of claim 35, wherein the user selection is made by input of a predetermined key.

37. The mobile terminal of claim 35, wherein the user selection is made according to priority levels given to the voice call and the digital multimedia signal by the user.

38. The mobile terminal of claim 34, wherein the user selection is made by input of a predetermined key.

39. The mobile terminal of claim 34, wherein the user selection is made according to priority levels given to the voice call and the digital multimedia signal by the user.

40. A method of processing an audio signal in a mobile terminal capable of receiving a digital multimedia signal having the compressed-coded audio and video signals multiplexed, comprising the steps of:
receiving a digital multimedia signal and separating the digital multimedia signal into an audio signal and video signal;
decoding the audio and video signals and outputting the decoded audio signal to a speaker and the decoded video signal to a display;
discontinuing decoding the audio signal when a voice call request is generated during receiving the digital multimedia signal; and
receiving an Radio Frequency (RF) signal for a voice call, converting the RF signal to an electrical voice signal, and outputting the electrical voice signal through the speaker.

41. The method of claim 40, further comprising the step of determining that the voice call request is generated upon input of a predetermined key indicating call connection when an incoming voice call is detected.

42. The method of claim 40, further comprising the step of determining that the voice call request is generated when an outgoing voice call is requested.

43. The method of claim 40, further comprising the step of determining that the voice call request is generated when the mobile terminal originates a call to a designated called party and receives a response signal from the called party.

44. The method of claim 40, further comprising the steps of:
determining whether the digital multimedia signal further includes a compressed-coded text signal when the voice call request is generated;
determining whether the text signal is being displayed on the display; and
separating the text signal from the digital multimedia signal, decoding the text signal, and displaying the decoded text signal on the display if the text signal is not being displayed on the display.

45. The method of claim 44, further comprising the step of deciding whether to discontinue decoding of the audio signal according to user selection when the voice call request is generated during receiving the digital multimedia signal.

46. The method of claim 45, wherein whether to block reception of the digital multimedia signal is decided according to the user selection.

47. The method of claim 46, wherein the user selection is made by input of a predetermined key.

48. The method of claim 46, wherein the user selection is made according to priority levels given to the voice call and the digital multimedia signal by the user.

49. The method of claim 40, further comprising the step of deciding whether to discontinue decoding of the audio signal according to user selection when the voice call request is generated during receiving the digital multimedia signal.

50. The method of claim 49, wherein whether to block reception of the digital multimedia signal is decided according to the user selection.

51. The method of claim 50, wherein the user selection is made by input of a predetermined key.

52. The method of claim 50, wherein the user selection is made according to priority levels given to the voice call and the digital multimedia signal by the user.

53. The method of claim 40, further comprising the steps of:
checking whether the voice call is over; and
resuming decoding the audio signal if the voice call is over.

54. A method of processing an audio signal in a mobile terminal capable of receiving a digital multimedia signal having a compressed-coded audio and video signals multiplexed, comprising the steps of:
receiving an Radio Frequency (RF) signal for a voice call, converting the RF signal to an electrical voice signal, and outputting the electrical voice signal through a speaker;
receiving a digital multimedia signal and separating the digital multimedia signal into an audio signal and a video signal if a digital multimedia request is generated during the voice call;
decoding the audio and video signals and providing the decoded audio signal to the speaker and the decoded video signal to a display; and
discontinuing decoding the audio signal, while decoding the video signal and displaying the decoded video signal on the display.

55. The method of claim 54, further comprising the steps of:
determining whether the digital multimedia signal further includes a compressed-coded text signal when the voice call request is generated;
determining whether the text signal is being displayed on the display; and
separating the text signal from the digital multimedia signal, decoding the text signal, and displaying the decoded text signal on the display if the text signal is not being displayed on the display.

56. The method of claim 55, further comprising the step of deciding whether to discontinue decoding the audio signal according to user selection when the voice call request is generated during receiving the digital multimedia signal.

57. The method of claim 56, wherein whether to block reception of the digital multimedia signal is decided according to the user selection.

58. The method of claim 56, wherein the user selection is made by input of a predetermined key.

59. The method of claim 56, wherein the user selection is made according to priority levels given to the voice call and the digital multimedia signal by the user.

60. The method of claim 54, further comprising the step of deciding whether to discontinue decoding the audio signal according to user selection when the voice call request is generated during receiving the digital multimedia signal.

61. The method of claim 60, wherein whether to block reception of the digital multimedia signal is decided according to the user selection.

62. The method of claim 60, wherein the user selection is made by input of a predetermined key.

63. The method of claim 60, wherein the user selection is made according to priority levels given to the voice call and the digital multimedia signal by the user.

64. The method of claim 54, further comprising the steps of:
checking whether the voice call is over; and
resuming decoding the audio signal and outputting the decoded audio signal through the speaker if the voice call is over.

* * * * *